Patented June 4, 1929.

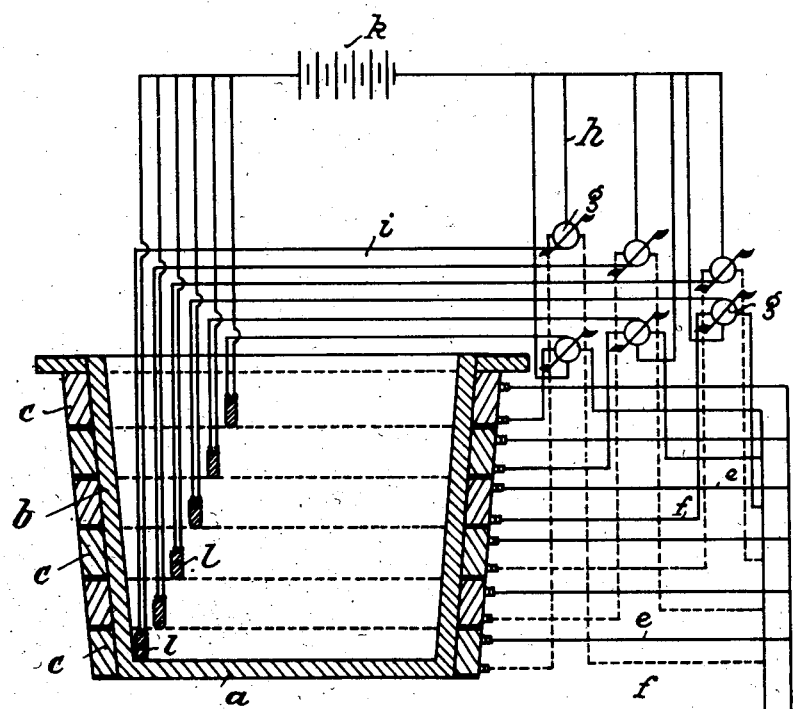
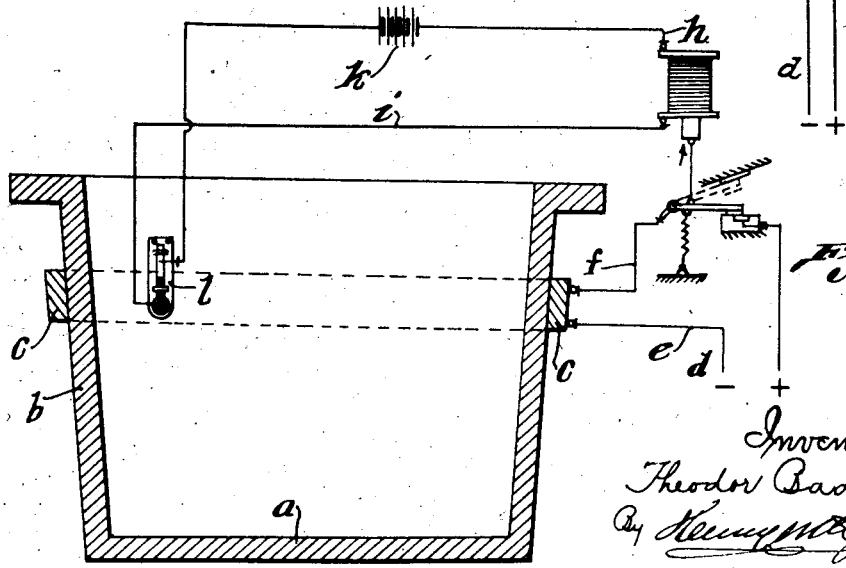

1,715,444

UNITED STATES PATENT OFFICE.

THEODOR BADER, OF WALDSHUT, GERMANY.

VESSEL FOR HEATING PURPOSES.

Application filed July 2, 1926, Serial No. 120,231, and in Germany July 7, 1925.

This invention relates to improvements in means for heating vessels and in particular casting pots heated electrically in known manner.

Casting pots are primarily employed for melting the metal for type casting-machines and the like, but may, however, also be employed for other purposes.

With electrically heated vessels there is, in particular, the danger that when the vessel is only partially full, for example when a large quantity of molten metal has been withdrawn, the heating elements in the upper part of the vessel may be heated too much and, in consequence, damaged or even destroyed.

In order to obviate, inter alia, this disadvantage according to the present invention each of a series of electrical heating elements, arranged one above the other on the walls of the vessel, either inside or outside, is connected individually to the mains through separate cut-out switches and the said switches, preferably operated by relays, are controlled by an equal number of temperature-governor devices, such as thermostats or thermometers, arranged in the vessel at the same levels as the corresponding heating elements. The arrangement may be such, for example, that the current in each heating element is interrupted when the thermometer in the corresponding zone is heated too severely as, for example, may occur when the surface of the liquid in the vessel falls below the level of the thermometer. Too severe heating of the element may thus be prevented.

It is obvious that there may be any number of heating elements and that the combination of such a scheme of connections with an arrangement of heating elements may also be employed for purposes other than melting, namely for boilers or the like in the chemical, foodstuff or similar industries, and may even be applied to the ordinary electrical household-saucepan with which there is always the danger that the heating element may burn through when the saucepan is partially or completely empty. The thermometer, moreover, may be connected with the switch or relay in any desired manner.

One form of casting pot, such as is employed, for example, for stereotype machines, is illustrated by way of example of the application of the invention, with its scheme of electrical connections, in the accompanying drawings.

Figure 1 is a general view of the device, partly in section.

Figure 2 illustrates one of the heater elements and related circuits.

Figure 3 shows in perspective, partly in section, a float-operated device;

Figure 4 is a circuit diagram therefor.

In the drawings the reference letter $a$ indicates the casting pot, on the outside wall $b$ of which electrical heating elements $c$ are arranged. All the heating elements are connected in parallel across the mains $d$ by means of leads $e$ and $f$. A relay $g$, which is connected with a control-thermometer $l$ through the leads $h$ and $i$ and the battery $k$, is inserted in each of the leads $f$. The thermometers $l$ are disposed inside the casting pot at the levels of the corresponding heating elements $c$.

If the entire casting pot is filled with liquid metal or other liquid, then the uniform temperature of the contents is lower than that at which the thermometers $l$ would close their contacts. If, however, the level sinks on account of the withdrawal of metal, or, with other liquids, on account of evaporation, then the thermometers, commencing with the topmost, emerge from the liquid, and in consequence become hot. The rise of temperature effects the closing of the battery circuit $h$, $i$, and the current in $d$, $e$, $c$, $f$, of the particular heating element is interrupted by its relay $g$. The successive disconnection, downwardly, of the individual heating elements continues as the level of the liquid falls, until the vessel is empty.

The operation is shown more in detail in Fig. 2. When the liquid fills vessel $a$ the thermometer $l$ which is adjacent the wall thereof, is relatively cool, i. e., cooler than the vessel wall, being heated by the coil $c$ and the electric contact is open.

When the liquid level drops below the thermometer it receives the full heat from the vessel wall and the mercury therein rises and closes the circuit $i$ of battery $k$ and coil $h$. The coil $h$ draws up its core and disconnects the heating circuit $e$, $f$.

The thermometers may also be arranged close to the heating elements and in this case, on too great heating of an element, close the circuit which operates the corresponding relay which interrupts the supply of current to the said element.

If a heating element is arranged on or in the bottom of the vessel, then it may be provided, in a similar manner, with a thermometer and automatic controlling means.

The relays may be electro-magnetic, but may also be constructed as mechanical relays and, in place of the thermometers, it is also possible to arrange a float in the liquid, which in accordance with the fall in level of the surface of the liquid, disconnects the heating elements mechanically or electrically.

The invention may also be applied to vessels heated by means other than electricity, for example, to casting pots heated by gas burners. In this case the separate thermometers or the float act on the regulating valve of one or more burners and adjust or close the same as occasion demands.

I claim:—

1. Vessel for heating purposes, comprising a container for the material to be heated, means for applying heat separately to zones in the vessel and automatic means for cutting off the supply of heat to individual zones in accordance with a drop of liquid level that produces variations of temperature at the said zones.

2. Vessel for heating purposes, comprising a container for the material to be heated, means for applying heat separately to zones in the vessel and automatic means for cutting off the supply of heat to successive individual zones in accordance with fall in the level of the surface of the liquid during heating.

3. Vessel for heating purposes, comprising a container for the material to be heated, means for applying heat separately to zones in the vessel, means at the said zones governed by the temperature prevailing at said zones and adapted, due to rise of temperature, caused by a fall in the level of the liquid, to effect the discontinuation of the supply of heat to the corresponding zones.

4. Vessel for heating purposes, comprising a container for the material to be heated, means for applying heat separately to zones in the vessel and means governed by temperature, arranged in juxtaposition to said heating means and adapted separately to effect the discontinuation of the supply of heat to the corresponding zones when the liquid level drops and the temperature rises above a certain limit.

5. Vessel for heating purposes, comprising a container for the material to be heated, electric heating elements for applying heat separately to zones in the vessel and automatic means interrupting the current in the heating elements for cutting off the supply of heat to individual zones in accordance with variations of temperature at the said zones.

6. Vessel for heating purposes, comprising a container for the material to be heated, electric heating elements for applying heat separately to zones in the vessel and automatic means interrupting the current in the heating elements for cutting off the supply of heat to successive individual zones in accordance with fall in the level of the surface of the liquid during heating.

7. Vessel for heating purposes, comprising a container for the material to be heated, electric heating elements for applying heat separately to zones in the vessel, means governed by temperature, arranged at the said zones and adapted, due to the rise of temperature caused by a fall of the level of the liquid, to effect the discontinuation of the supply of heat to the corresponding zones by interrupting the current in the heating elements, substantially as set forth.

8. Vessel for heating purposes, comprising a container for the material to be heated, electrical heating elements for applying heat separately to zones in the vessel, means governed by temperature, arranged in juxaposition to said electric heating elements and adapted to effect separately the interruption of the supply of current to the heating elements in the corresponding zones when the temperature rises above a certain limit.

In testimony that I claim the foregoing as my invention, I have signed my name this 16th day of June, 1926.

THEODOR BADER.